(12) United States Patent
Kwon et al.

(10) Patent No.: US 7,996,124 B2
(45) Date of Patent: Aug. 9, 2011

(54) METHOD FOR CONTROLLING FUEL CELL VEHICLE

(75) Inventors: Sang Uk Kwon, Gyeonggi-do (KR); Soon Il Jeon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 381 days.

(21) Appl. No.: 12/228,218

(22) Filed: Aug. 11, 2008

(65) Prior Publication Data

US 2009/0222157 A1 Sep. 3, 2009

(30) Foreign Application Priority Data

Feb. 29, 2008 (KR) .......................... 10-2008-0018722

(51) Int. Cl.
*G06F 19/00* (2011.01)
(52) U.S. Cl. .............................. 701/22; 363/95; 429/430
(58) Field of Classification Search .................... 701/22, 701/36; 363/95, 41, 58; 429/430
See application file for complete search history.

(56) References Cited

U.S. PATENT DOCUMENTS

| | | | | |
|---|---|---|---|---|
| 5,887,670 | A * | 3/1999 | Tabata et al. ................ | 180/65.25 |
| 7,413,042 | B2 * | 8/2008 | Saitou et al. ............. | 180/65.285 |
| 7,550,942 | B2 * | 6/2009 | Kurosawa ..................... | 320/101 |
| 2004/0202900 | A1 * | 10/2004 | Pavio et al. ........................ | 429/9 |
| 2008/0108477 | A1 * | 5/2008 | Noll ................................. | 477/23 |
| 2008/0171239 | A1 * | 7/2008 | Tucker et al. .................... | 429/13 |
| 2009/0008167 | A1 * | 1/2009 | Aoyagi et al. ................ | 180/65.3 |
| 2009/0017350 | A1 * | 1/2009 | Umayahara ...................... | 429/22 |
| 2009/0032135 | A1 * | 2/2009 | Iida et al. ............................ | 141/5 |
| 2009/0055060 | A1 * | 2/2009 | Minami ............................ | 701/54 |
| 2009/0187314 | A1 * | 7/2009 | Kitamura et al. ................ | 701/45 |
| 2009/0226770 | A1 * | 9/2009 | Manabe et al. .................. | 429/13 |

FOREIGN PATENT DOCUMENTS

| | | |
|---|---|---|
| JP | 2004-326985 A | 11/2004 |
| JP | 2005-149920 | 6/2005 |
| JP | 2006-073506 | 3/2006 |
| JP | 2006-351407 | 12/2006 |
| KR | 10-2004-0009318 | 1/2004 |
| KR | 10-2007-0060752 | 6/2007 |

* cited by examiner

*Primary Examiner* — Thomas G Black
*Assistant Examiner* — Marthe Marc Coleman
(74) *Attorney, Agent, or Firm* — Edwards Angell Palmer & Dodge LLP; Peter F. Corless

(57) ABSTRACT

In one aspect a method for controlling a fuel cell vehicle is provided, comprising generating a torque ($T_{ACCEL}$) calculated based or an accelerator pedal depression value upon completion of start-up of a fuel cell and entering a fuel cell only mode; performing a torque limit control for the torque ($T_{ACCEL}$) calculated based on the accelerator pedal depression value; performing charging from the fuel cell to a power storage means while the vehicle moves slowly by the torque limit control under the fuel cell only mode; and directly connecting the fuel cell to the power storage means by a main relay to enter a hybrid mode, when a voltage difference between the fuel cell and the power storage means is within a predetermined range. Preferred methods can protect the fuel cell, reduce the time for vehicle start-up and improve driving performance.

5 Claims, 4 Drawing Sheets

METHOD FOR CONTROLLING FUEL CELL VEHICLE

CROSS-REFERENCE TO RELATED APPLICATION

This application claims under 35 U.S.C. §119(a) the benefit of Korean Patent Application No. 10-2008-0018722 filed Feb. 29, 2008, the entire contents of which are incorporated herein by reference.

BACKGROUND (a) Technical Field

The present invention relates to a method for controlling a fuel cell vehicle, in which a torque correction factor is used for protecting fuel cell, reducing start-up time and improving driving performance.

(b) Background Art

In a conventional fuel cell-battery hybrid vehicle, a high-voltage DC-DC converter is positioned between a fuel cell and a battery to absorb a voltage difference between the fuel cell and the battery and performs a charge-discharge control of the battery or a power control of the fuel cell. Accordingly, it is not necessary to provide a strategy for a specialized start-up control to match the voltages of the fuel cell and the battery.

On the other hand, in a fuel cell-battery hybrid vehicle that does not employ any high-voltage DC-DC converter, an initial battery charging device and a start-up control strategy corresponding to the same are required to match the voltages of the fuel cell and the battery.

U.S. Pat. No. 6,815,100 discloses a control device for starting a fuel cell which prevents an excessive reduction of the fuel cell by controlling an output current of the fuel cell using a DC-DC chopper provided at the output side of the fuel cell, before the fuel cell is connected to a power storage unit with a reduced voltage, after the power storage unit such as a battery supplies electric power to a motor and auxiliary devices for driving the fuel cell during start-up of the vehicle.

Moreover, Korean Unexamined Patent Application Publication No. 2006-0003543 discloses a method of controlling start-up of a fuel cell-supercapacitor hybrid vehicle, in which, during start-up, a fuel cell is started by an auxiliary battery, electric power of the fuel cell is charged in a supercapacitor through a multi-resistor of an initial supercapacitor charging device and, when the voltage of the supercapacitor becomes equal to that of the fuel cell, the fuel cell is connected to the supercapacitor by a main relay so that the vehicle may be driven.

However, the above conventional start-up control methods have a drawback in that the DC-DC converter or the initial charging device with a multi-resistor is required to charge the power storage unit or the supercapacitor. Moreover, when a fuel cell only mode is changed to a hybrid mode, where the fuel cell and the supercapacitor are directly connected, torque may be suddenly increased by depression of an accelerator pedal, and thus the vehicle may move suddenly.

Accordingly, an appropriate start-up sequence control, which can protect the fuel cell, reduce the start-up time, charge the supercapacitor, and improve the driving performance at the same time, is required in the fuel cell-supercapacitor hybrid system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a method for controlling a fuel cell vehicle, the method comprising: generating a torque ($T_{ACCEL}$) calculated based on an accelerator pedal depression value upon completion of start-up of a fuel cell and entering a fuel cell only mode; performing a torque limit control for the torque ($T_{ACCEL}$) calculated based on the accelerator pedal depression value; performing charging from the fuel cell to a power storage means while the vehicle moves slowly by the torque limit control under the fuel cell only mode; and directly connecting the fuel cell to the power storage means by a main relay to enter a hybrid mode, when a voltage difference between the fuel cell and the power storage means is within a predetermined range.

In a preferred embodiment, the charging of the power storage means is performed by a current limit control according to a duty ratio control of an insulated gate bipolar transistor (IGBT) of an initial charging device, connected between the fuel cell and the power storage means, before the fuel cell and the power storage means are directly connected.

In another preferred embodiment, in the torque limit control, the torque ($T_{ACCEL}$) calculated based on the accelerator pedal depression value is obtained by multiplying a maximum motor torque ($T_{MAX}$) by an accelerator pedal depression value ($\beta_{Dep}$: 0 to 1), and a limited torque is calculated by multiplying the torque ($T_{ACCEL}$) by a torque correction factor ($\alpha$) having a constant value.

In still another preferred embodiment, the torque correction factor ($\alpha$) is gradually increased when the fuel cell only mode is changed to the hybrid mode, where the fuel cell and the power storage means are directly connected and, if the torque correction factor ($\alpha$) is increased up to a predetermined maximum value, a normal operation is performed without any torque limit control.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
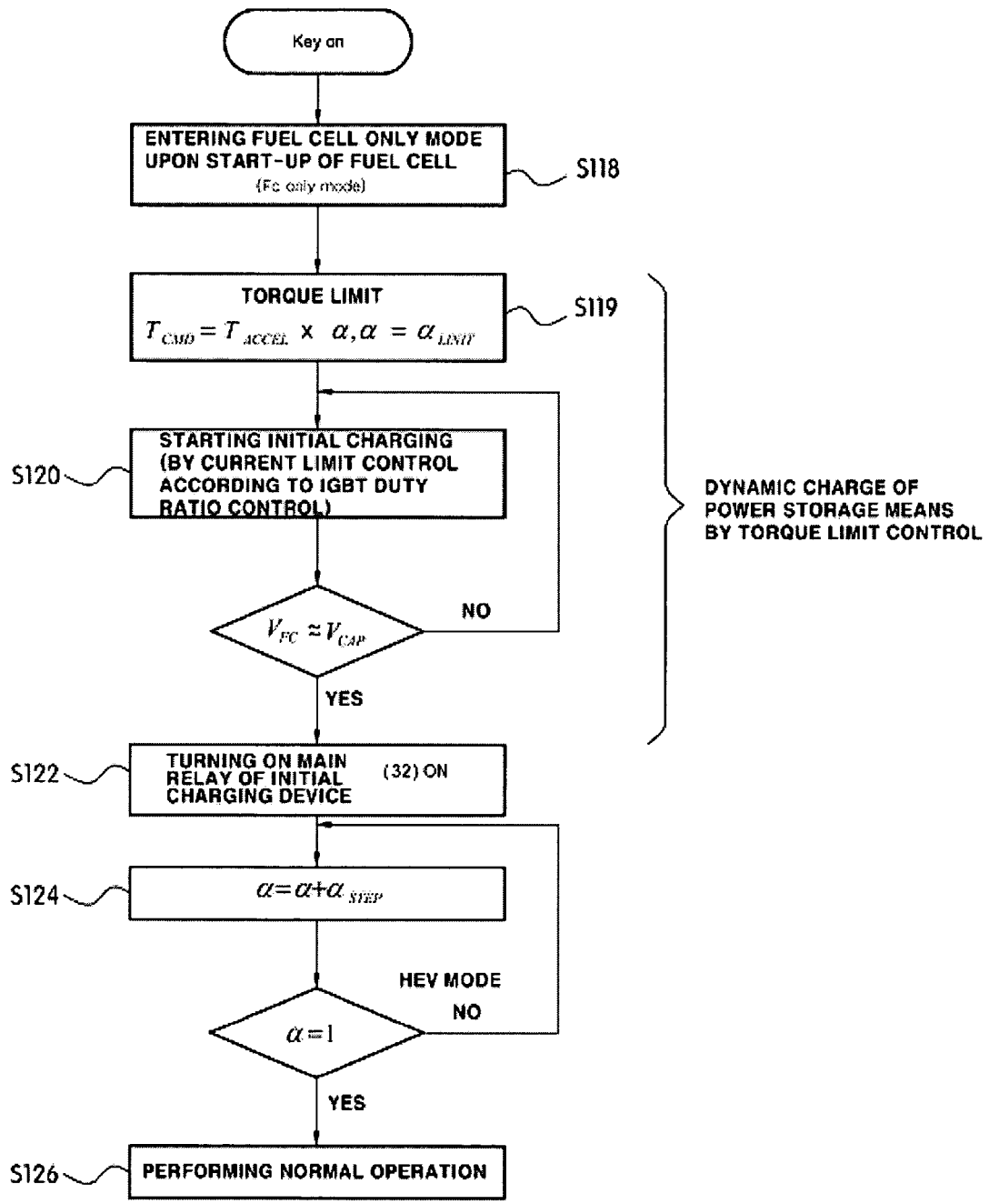
FIG. 1 is a flowchart illustrating the control sequence after completion of start-up of a fuel cell in accordance with a preferred embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 3:
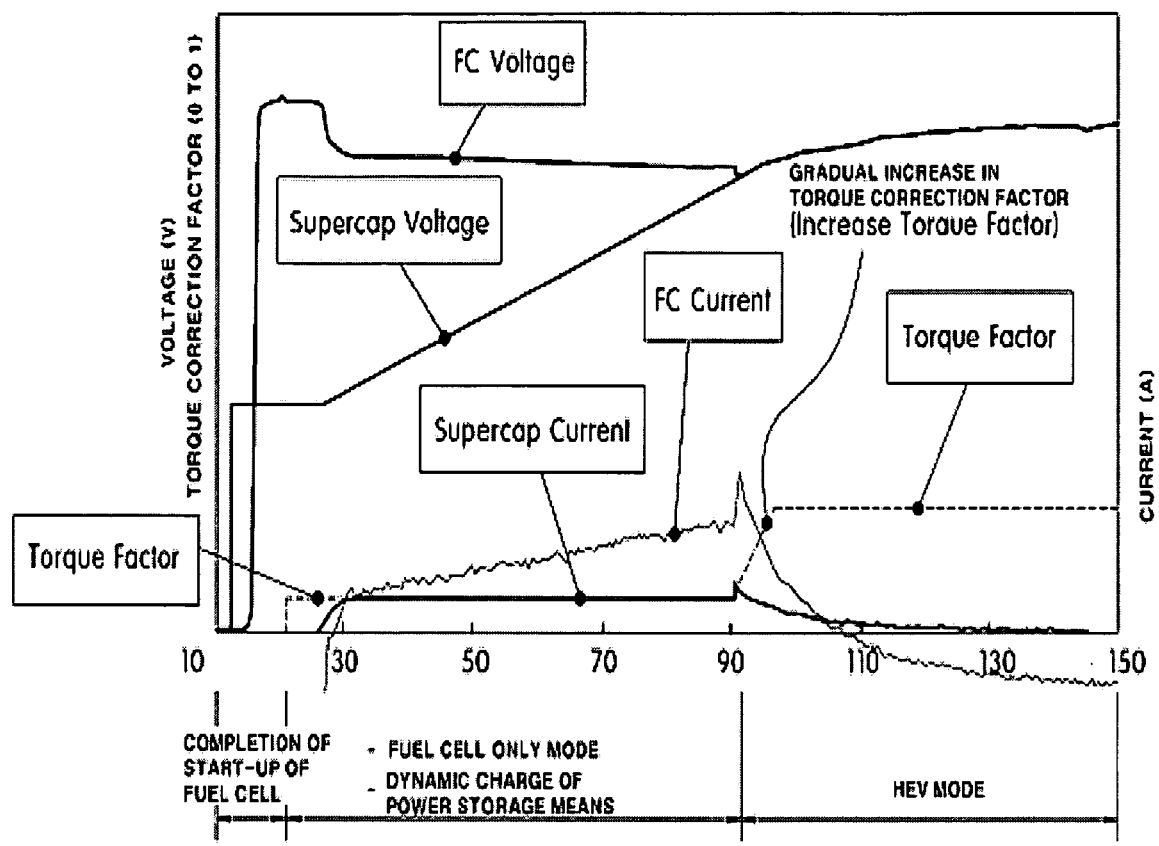
FIG. 3 is a schematic diagram showing the power network of a hybrid vehicle including a fuel cell and a power storage means, to which a method for controlling the fuel cell vehicle in accordance with the present invention is applied.

Referring to FIG. 3, the power network of a fuel cell-power storage means hybrid vehicle is described. The fuel cell-power storage means hybrid vehicle comprises a power supply means including a fuel cell 10, an auxiliary power source, a low-voltage power converter (LDC) 12, and a 12V auxiliary battery 14. The vehicle further comprise a fuel cell balance of plant (BOP) 18, a motor 20, a motor control unit (MCU) 22, a fuel cell relay 24, and an MCU relay 26, which are connected to the power supply means.

The auxiliary power source represents a power storage means 16 such as a supercapacitor, a high-voltage battery, etc., and is connected to an initial charging device 30.

The low-voltage power converter (LDC) 12 is a device that converts electrical power into low voltage for operation of components using electrical power of the 12V auxiliary battery 14. It charges the auxiliary battery 14 with the low voltage since the components continuously consume power during operation of the vehicle.

The high-voltage fuel cell BOP 18 such as an air blower, a hydrogen recirculation blower, a water pump, etc. should be operated for start-up of the fuel cell 10, and the voltage generated in the fuel cell 10 has the same level as that of the high-voltage fuel cell BOP 18, the voltage ranging from 250 to 450 V, for example.

The motor 20 and an inverter are directly connected to the fuel cell 10, and the power storage means 16 is connected to the fuel cell 10 via the initial charging device 30 for power assist and regenerative braking.

Moreover, various relays such as a fuel cell relay 24 and an MCU relay 26 for switching power are installed in a main bus terminal. Furthermore, a blocking diode 28 is provided to prevent reverse current from flowing to the fuel cell 10.

The initial charging device 30 is a buck type converter having an electrical circuit separate from a main relay 32 and disposed between the fuel cell 10 and the power storage means 16. The initial charging device 30 serves to prevent the main relay 32 from sticking by preventing excessive current flow through a duty ratio control of an insulated gate bipolar transistor (IGBT) 34, and charge the power storage means 16.

When the voltages at both terminals of the fuel cell 10 and the power storage means 16 become equal to each other, the operation of the IGBT 34 is stopped and the main relay 32 is turned on such that the fuel cell 10 and the power storage means 16 are directly connected.

Reference numeral 36 denotes a supercapacitor cutoff relay that serves to protect an internal capacitor.

Hereinafter, the start-up sequence of the fuel cell in the fuel cell-power storage means hybrid vehicle having the above configuration will be described.

Figure 2:
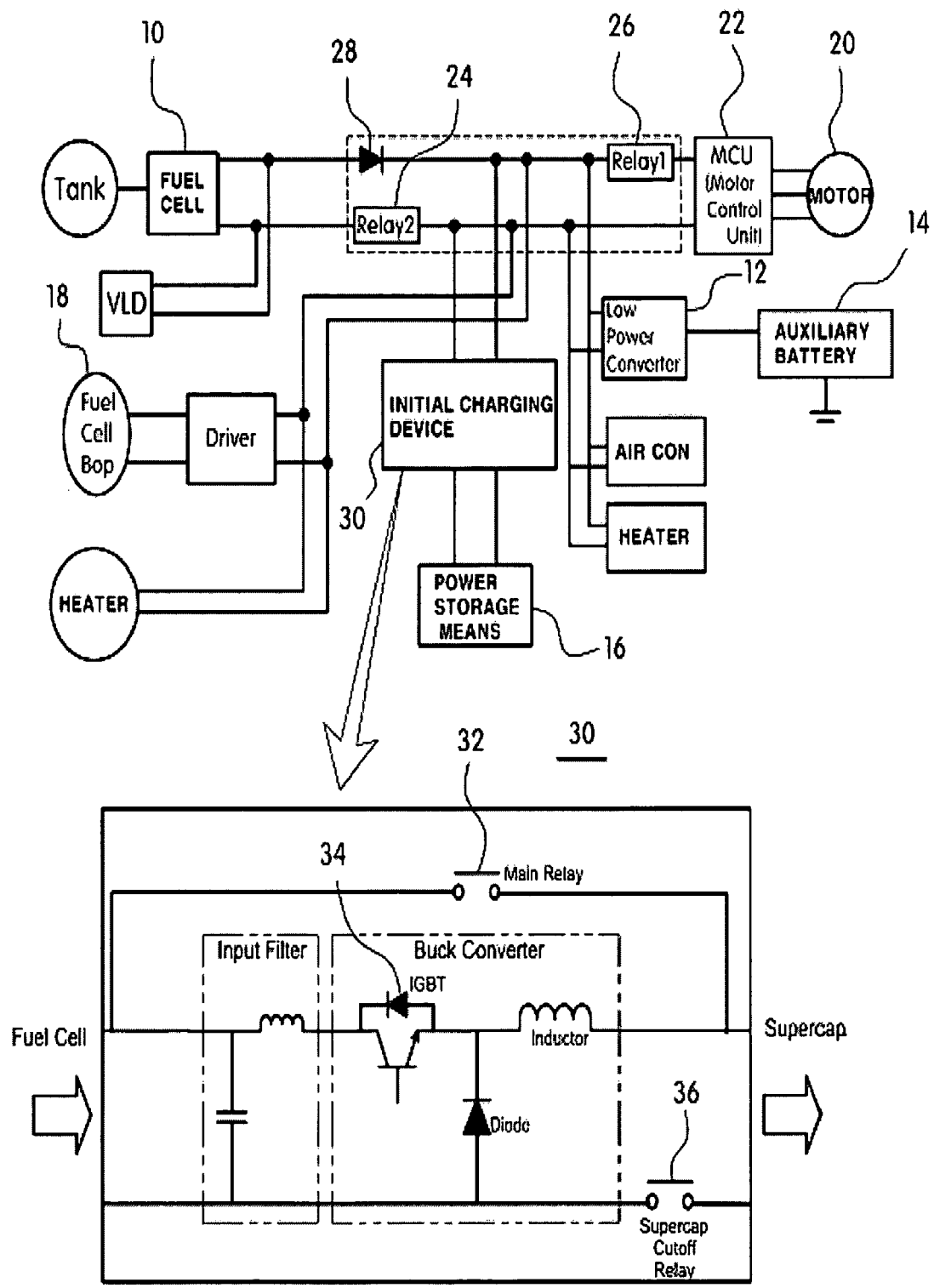
FIG. 2 is a flowchart illustrating the sequence until completion of start-up of the fuel cell.

FIG. 2 is a flowchart illustrating the sequence until completion of start-up of the fuel cell.

The fuel cell 10 is started up by a boost of the low-voltage power converter (LCD) 12. However, if the auxiliary battery 14 is abnormal or if a lot of initial start-up energy is required, such as during cold start-up, the start-up of the fuel cell 10 is performed by the power storage means 16. The necessity of the above start-up control is caused by the fact that the voltage of the power storage means 16 is rapidly changed according to circumstances.

A controller determines whether the auxiliary battery 14 is low or whether the cold start-up is performed or the start-up time is long (S101) and, if so, the voltage $V_{LDC\_REF}$ of the main bus terminal is set to be equal to that of the power storage means 16 through the LDC boost (S102). Then, the supercapacitor cutoff relay 36 and the main relay 32 of the initial charging device 30 are turned on (S103) and the low-voltage power converter (LCD) 12 is turned off (S104) such that the fuel cell BOP 18 is driven by the power storage means 16 to increase the fuel cell voltage $V_{FC}$ (S105).

Here, $V_{LP1}$ is a greater value of the fuel cell voltage $V_{FC}$ capable of being applied to the fuel cell BOP 18 and a minimum voltage required for operation of the fuel cell BOP 18 and may vary according to circumstances.

If the voltage $V_{CAP}$ of the power storage means 16 is lower than $V_{LP1}$, the voltage $V_{LDC\_REF}$ of the main bus terminal is maintained at $V_{LP1}$ through the LDC boost (S106). Then, it is determined whether the fuel cell voltage $V_{FC}$ is greater than $V_{LP1}$ and, if so, the low-voltage power converter (LDC) 12 and the main relay 32 of the initial charging device 30 are turned off (S107).

Meanwhile, if the auxiliary battery 14 is high or if the cold start-up is not performed, the voltage $V_{LDC\_REF}$ of the main bus terminal is maintained at $V_{LP1}$ through the LDC boost (S108), and the fuel cell BOP 18 is driven by the auxiliary battery 14 to increase the fuel cell voltage $V_{FC}$ (S109).

If the fuel cell voltage $V_{FC}$ is greater than $V_{LP1}$, the low-voltage power converter (LDC) 12 is turned off (S110) to prevent the fuel cell 10 from generating an excessive voltage.

As above, after the fuel cell voltage is started by discharge of the power storage means 16 or through the LDC boost, if the fuel cell voltage $V_{FC}$ is greater than $V_{LP1}$, the connection between the low-voltage power converter (LDC) 12 and the power storage means 16 is released and the fuel cell BOP 18 is driven by the output of the fuel cell 10 (S112).

Moreover, after completion of start-up of the fuel cell 10 (S114), the auxiliary battery 14 is charged at a low voltage through an LDC buck, and the MCU relay 26 and the supercapacitor cutoff relay 36 are turned on to prepare for operation of the vehicle (S116), thus entering a fuel cell only mode.

Next, the sequence control method after completion of start-up of the fuel cell and entering the fuel cell only mode will be described.

Figure 4:
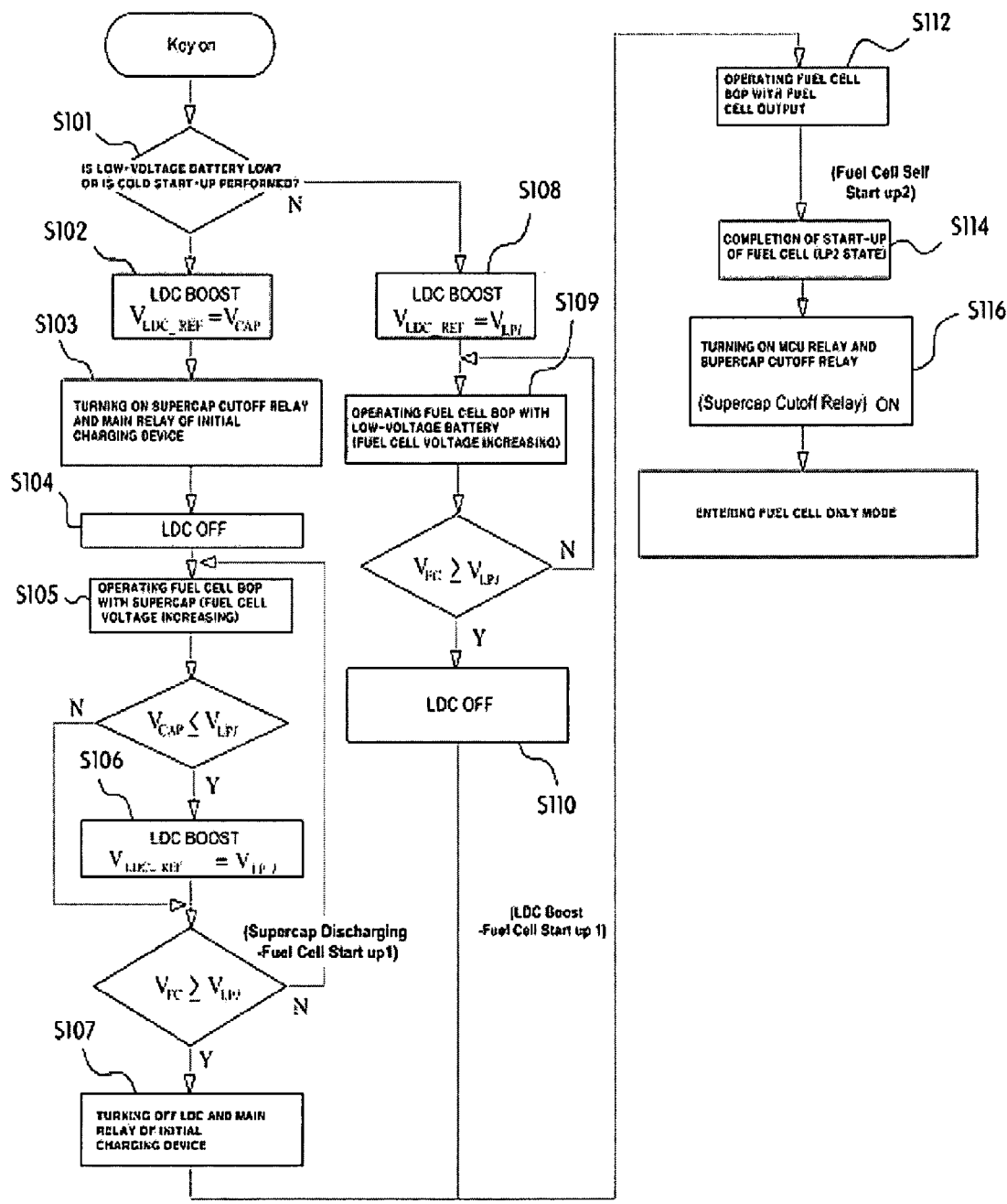
FIG. 4 shows actual driving test data to which the method for controlling the fuel cell vehicle in accordance with the present invention is applied.

FIG. 1 illustrates the control sequence after completion of start-up of the fuel cell in accordance with a preferred embodiment of the present invention. FIG. 4 shows actual driving test data for a dynamic charge of the power storage means 16 and shows a series of processes, in which a limited torque is applied even during charging to enable operation of the vehicle, and a torque increase rate is limited before entering a hybrid mode to prevent sudden start.

If the fuel cell only mode, in which the power storage means 16 is not connected to the fuel cell 10, is entered upon completion of start-up of the fuel cell (S118), a torque for operation of the vehicle is generated.

That is, when a driver depresses an accelerator pedal, a torque calculated by the following formula 1 based on the depression value of the accelerator pedal is generated so that the vehicle can move.

$$T_{ACCEL} = T_{MAX} \times \beta_{Dep} \quad \text{[Formula 1]}$$

wherein $T_{ACCEL}$ represents a running torque calculated based on an accelerator pedal depression value, $T_{MAX}$ represents a maximum motor torque, and $\beta_{Dep}$ represents an accelerator pedal depression value.

A torque limit control for the torque $T_{ACCEL}$ calculated based on the accelerator pedal depression value is performed (S109). The torque limit control is performed based on the following formula 2.

$$T_{CMD} = T_{ACCEL} \times \alpha, \alpha = \alpha_{INIT} \quad \text{[Formula 2]}$$

wherein $T_{CMD}$ represents a limited torque, and $\alpha$ represents a torque correction factor (0 to 1).

As shown in formula 2, the limited torque is calculated by multiplying the torque $T_{ACCEL}$ calculated based on the accelerator pedal depression value by the torque correction factor $\alpha$ having a constant value and, at the beginning stage of the torque limit control, the torque $T_{ACCEL}$ is multiplied by $\alpha_{INIT}$ representing an initial value (minimum value) of the torque correction factor to initiate the torque limit control.

Like this, under the fuel cell only mode, the torque limit control is performed to make the vehicle move slowly and, at the same time, charging from the fuel cell to the power storage means 16 is performed (S120).

That is, the charging of the power storage means 16 is performed before the fuel cell 10 and the power storage means 16 are directly connected, and the charging is made by a current limit control according to a duty ratio control of the IGBT 34 of the initial charging device 30 connected between the fuel cell 10 and the power storage means 16.

For example, when the IGBT 34 is turned on, the charging current of the power storage means 16 is increased by $$\Delta I_{L\_on} \left( \Delta I_{L\_on} = \frac{1}{L} \int_{T_{ON}} (V_{FC} - V_{CAP}) \, dt \right) \text{ and,}$$

when the IGBT 34 is turned off, the charging current of the supercapacitor of the power storage means 16 is reduced by $\Delta I_{L\_off}$. Accordingly, if the charging current is set to, e.g., 50 A, the duty ratio is adjusted in consideration of the increase and decrease in the charging current of the power storage means 16 to maintain the charging current at 50 A.

At this time, $\Delta I_{L\_ON}$ represents an increase in the current flowing to the supercapacitor of the initial charging device 30 when the IGBT 34 is turned on, and $\Delta I_{L\_OFF}$ represents a decrease in the current flowing to the supercapacitor of the initial charging device 30 when the IGBT 34 is turned off.

Like this, the torque limit control is performed to make the vehicle move slowly, and thus the charging from the fuel cell 10 to the power storage means 16 is performed more easily.

Subsequently, when the charging of the power storage means 16 is completed by the initial charging device 30, the main relay 32 of the initial charging device 30 is turned on to directly connect the fuel cell 10 and the power storage means 16, making the vehicle enter the hybrid mode (S122).

If there is no voltage difference between the fuel cell 10 and the power storage means 16 (i.e., if the fuel cell voltage $V_{FC}$ becomes equal to the voltage $V_{CAP}$ of the power storage means 16), the controller determines that the charging of the power storage means 16 has been completed, and thus the fuel cell 10 and the power storage means 16 are directly connected by the main relay 32, thus entering the hybrid mode.

When the vehicle enters the hybrid mode, the torque correction factor $\alpha$ is gradually increased up to a predetermined maximum value and, if the torque correction factor $\alpha$ is increased up to the maximum value, a normal operation is performed without any torque limit control (S126). For example, as shown in FIG. 4, when the fuel cell 10 and the power storage means 16 are directly connected, the torque correction factor is gradually increased and, if the value reaches "1", the maximum value, the normal operation is performed without any torque limit control. Such a gradual increase of the torque correction factor prevents sudden start of the vehicle.

As described above, the present invention provides various advantages including the following. First, the charging from the fuel cell to the power storage means can be performed more dynamically by the torque limit control using a torque correction factor while the vehicle moves slowly under the fuel cell only mode after completion of start-up of the fuel cell. Second, it is possible to prevent sudden start of the vehicle by gradually increasing the torque correction factor when entering the hybrid mode after the voltage of the fuel cell becomes equal to that of the power storage means.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a fuel cell vehicle, the method comprising:
    generating a torque ($T_{ACCEL}$) calculated based on an accelerator pedal depression value upon completion of start-up of a fuel cell and entering a fuel cell only mode;
    performing a torque limit control for the torque ($T_{ACCEL}$) calculated based on the accelerator pedal depression value;
    performing charging from the fuel cell to a power storage means while the vehicle moves slowly by the torque limit control under the fuel cell only mode; and
    directly connecting the fuel cell to the power storage means by a main relay to enter a hybrid mode, when a voltage difference between the fuel cell and the power storage means is within a predetermined range,
    wherein the charging of the power storage means is performed by a current limit control according to a duty ratio control of an insulated gate bipolar transistor (IGBT) of an initial charging device, connected between the fuel cell and the power storage means, before the fuel cell and the power storage means are directly connected.

2. The method of claim 1, wherein, in the torque limit control, the torque ($T_{ACCEL}$) calculated based on the accelerator pedal depression value is obtained by multiplying a maximum motor torque ($T_{MAX}$) by an accelerator pedal depression value ($\beta_{Dep}$: 0 to 1), and a limited torque is calculated by multiplying the torque ($T_{ACCEL}$) by a torque correction factor ($\alpha$) having a constant value.

3. The method of claim 2, wherein the torque correction factor ($\alpha$) is gradually increased when the fuel cell only mode is changed to the hybrid mode, where the fuel cell and the power storage means are directly connected and, if the torque correction factor (α) is increased up to a predetermined maximum value, a normal operation is performed without any torque limit control.

4. A method for controlling a fuel cell vehicle, the method comprising:
   generating a torque ($T_{ACCEL}$) calculated based on an accelerator pedal depression value upon completion of startup of a fuel cell and entering a fuel cell only mode;
   performing a torque limit control for the torque ($T_{ACCEL}$) calculated based on the accelerator pedal depression value;
   performing charging from the fuel cell to a power storage means while the vehicle moves slowly by the torque limit control under the fuel cell only mode; and
directly connecting the fuel cell to the power storage means by a main relay to enter a hybrid mode, when a voltage difference between the fuel cell and the power storage means is within a predetermined range,
   wherein, in the torque limit control, the torque ($T_{ACCEL}$) calculated based on the accelerator pedal depression value is obtained by multiplying a maximum motor torque ($T_{MAX}$) by an accelerator pedal depression value ($\beta_{Dep}$: 0 to 1), and a limited torque is calculated by multiplying the torque ($T_{ACCEL}$) by a torque correction factor (α) having a constant value.

5. The method of claim 4, wherein the torque correction factor (α) is gradually increased when the fuel cell only mode is changed to the hybrid mode, where the fuel cell and the power storage means are directly connected and, if the torque correction factor (α) is increased up to a predetermined maximum value, a normal operation is performed without any torque limit control.

* * * * *